United States Patent
Iyer et al.

(10) Patent No.: US 12,216,018 B2
(45) Date of Patent: Feb. 4, 2025

(54) SYSTEM AND METHOD FOR MOVING MATERIAL

(71) Applicant: DEERE & COMPANY, Moline, IL (US)

(72) Inventors: Suchitra Iyer, Pune (IN); Sanket Pawar, Pune (IN); Saumil Shah, Pune (IN); Asad Rashid, Pune (IN); Bryon P. Neumann, Grimsby (CA)

(73) Assignee: DEERE & COMPANY, Moline, IL (US)

(*) Notice: Subject to any disclaimer, the term of this patent is extended or adjusted under 35 U.S.C. 154(b) by 708 days.

(21) Appl. No.: 17/221,484

(22) Filed: Apr. 2, 2021

(65) Prior Publication Data

US 2022/0314860 A1    Oct. 6, 2022

(51) Int. Cl.
| | | |
|---|---|---|
| *G01M 1/12* | (2006.01) | |
| *B60P 1/28* | (2006.01) | |
| *E02F 9/20* | (2006.01) | |
| *E02F 9/26* | (2006.01) | |

(52) U.S. Cl.
CPC .............. *G01M 1/122* (2013.01); *E02F 9/265* (2013.01); *B60P 1/286* (2013.01); *E02F 9/2041* (2013.01)

(58) Field of Classification Search
None
See application file for complete search history.

(56) References Cited

U.S. PATENT DOCUMENTS

| | | | |
|---|---|---|---|
| 4,981,186 A | 1/1991 | Shankle et al. | |
| 5,890,770 A * | 4/1999 | Palmberg, Jr. ............ | B60P 1/26 298/23 M |
| 6,157,889 A * | 12/2000 | Baker ..................... | G06Q 10/08 701/124 |
| 8,386,134 B2 | 2/2013 | Morey et al. | |
| 9,605,959 B2 | 3/2017 | Bando et al. | |
| 9,868,623 B1 | 1/2018 | Guy | |
| 2010/0084908 A1* | 4/2010 | Montocchio ............ | B60P 1/045 298/22 C |
| 2012/0290178 A1* | 11/2012 | Suzuki ..................... | E02F 9/265 701/50 |
| 2017/0219453 A1* | 8/2017 | Landes ................ | G01M 17/007 |
| 2018/0087240 A1 | 3/2018 | Schmitt et al. | |
| 2018/0179732 A1* | 6/2018 | Bartsch .................... | E02F 9/205 |
| 2018/0229428 A1* | 8/2018 | Takano ................... | B22F 12/10 |
| 2021/0188147 A1* | 6/2021 | De Jager ................ | B60P 1/286 |
| 2021/0232137 A1* | 7/2021 | Whitfield, Jr. ....... | G05D 1/0027 |

* cited by examiner

*Primary Examiner* — Christian Chace
*Assistant Examiner* — Scott R Jagolinzer
(74) *Attorney, Agent, or Firm* — Michael Best & Friedrich LLP (57) ABSTRACT

A method of moving material, using a first machine, from a first location to a second location, the second location being a dump bed of a second machine. The method includes determining, by a controller of the first machine, a type of a material to be moved, sending, by the controller of the first machine, the material type to a controller of the second machine, determining, by a controller of the second machine, a load distribution on the dump bed based on the material, determining, by the controller of the second machine, a first position of the dump bed at which a first dump should be unloaded from the first machine, and sending, by the controller of the second machine, an identification of the first position to the controller of the first machine.

19 Claims, 3 Drawing Sheets

SYSTEM AND METHOD FOR MOVING MATERIAL

FIELD

The present disclosure relates to systems and methods including a first machine (e.g., an excavator) that moves material to a second machine (e.g., a dump truck).

SUMMARY

In one embodiment, system for moving material is disclosed. The system including a first machine including a bucket configured to move a material, an operator interface, and a first controller configured to communicate with the operator interface. The system further including a second machine including a dump bed configured to receive the material from the first machine, a sensor configured to measure the load of a dump bed, and a second controller configured to communicate with the sensor and the first controller. The first controller is configured to receive a first signal corresponding to a type of the material being moved by the bucket from the operator interface and generate a second signal corresponding to the type of the material being moved by the bucket. The second controller is configured to determine, based on the second signal, a load distribution of the material in the dump bed. The second controller is also configured to determine, based on the load distribution, a first position of the dump bed at which a first dump should be unloaded from the bucket of the first machine. The second controller is also configured to send a third signal corresponding to the first position to the first controller.

In another embodiment, a system for moving material is disclosed. The system includes a first machine that moves a material and a second machine having a dump bed that receives the material from the first machine. The first machine includes a first controller. The second machine further includes a sensor configured to measure a load on the dump bed and a second controller configured to communicate with the sensor and the first controller. The first controller is configured to receive a first signal corresponding to a type of the material being moved by the first machine and send a second signal corresponding to the type of the material being moved by the first machine to the second controller. The second controller is configured to determine, based on the second signal, a load distribution of the material in the dump bed, determine, based on the load distribution, a first position of the dump bed where a first dump should be unloaded from the bucket of the first machine, and send a third signal corresponding to the first position to the first controller.

A method of moving material, using a first machine, from a first location to a second location, the second location being a dump bed of a second machine. The method includes determining, by a controller of the first machine, a type of a material to be moved, sending, by the controller of the first machine, the material type to a controller of the second machine, determining, by a controller of the second machine, a load distribution on the dump bed based on the material, determining, by the controller of the second machine, a first position of the dump bed at which a first dump should be unloaded from the first machine, and sending, by the controller of the second machine, an identification of the first position to the controller of the first machine.

DETAILED DESCRIPTION

Before implementations of the disclosure are explained in detail, it is to be understood that the disclosure is not limited in its application to the details of construction and the arrangement of components set forth in the following description or illustrated in the accompanying drawings. The disclosure is capable of supporting other implementations and of being practiced or of being carried out in various ways.

Figure 1A:
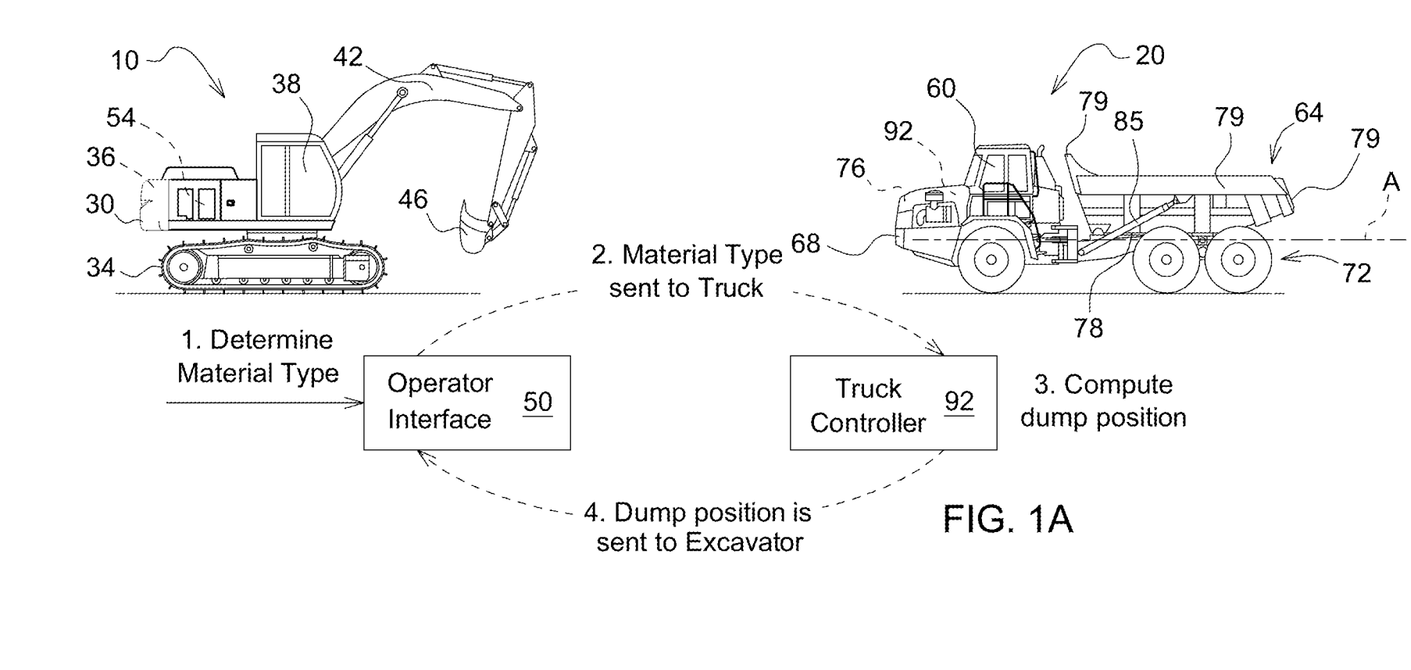
FIG. 1A illustrates a schematic of a system for moving material and includes a first machine in communication with a second machine.
Figure 1B:
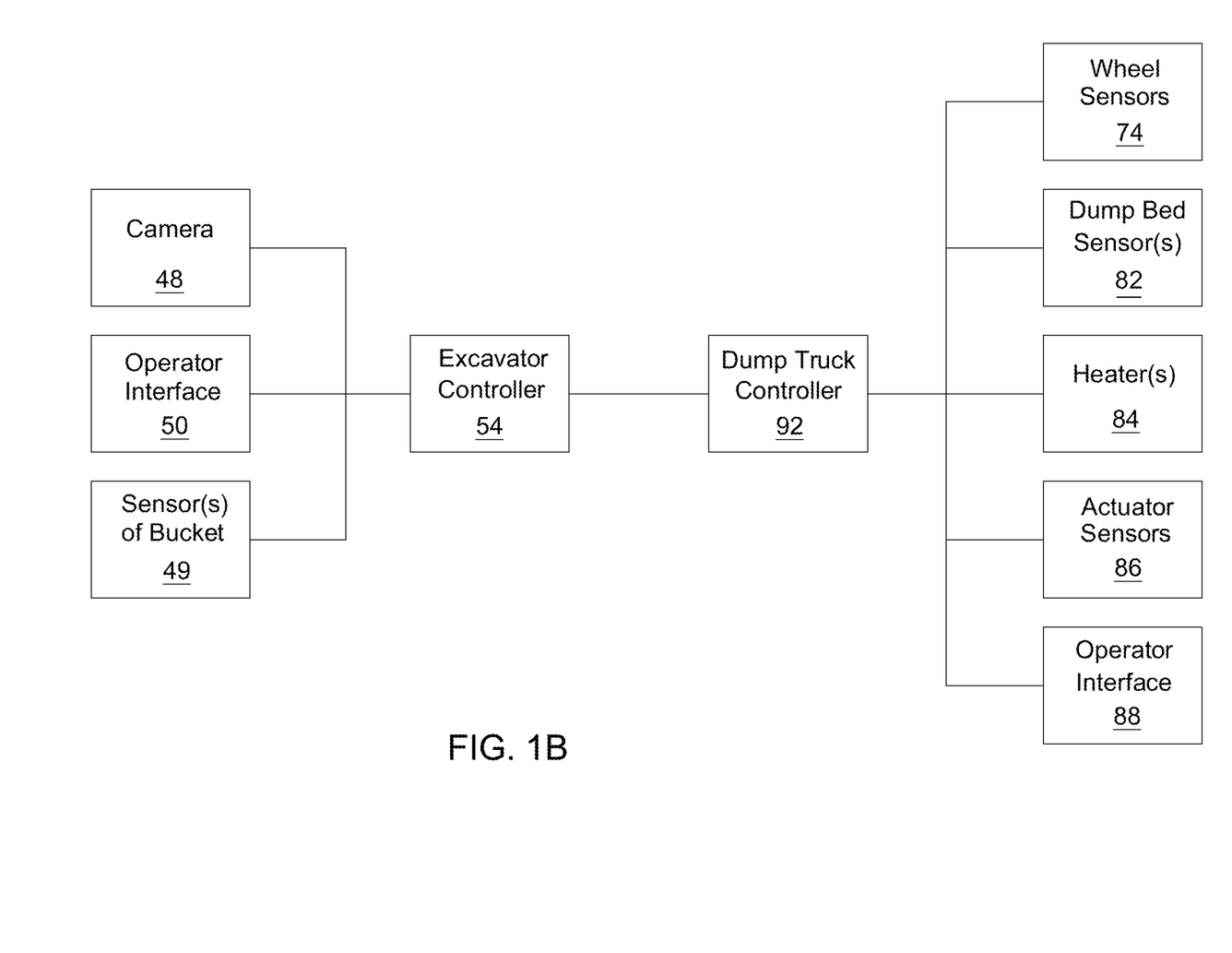
FIG. 1B illustrates another schematic of a system for moving material.

FIGS. 1A-1B illustrate a system including an excavator 10 and a dump truck 20 that are configured to communicate with one another.

The excavator 10 includes a chassis 30 supported by a pair of crawlers 34 (only one of which is shown). The excavator 10 further includes a prime mover 36 (e.g., a motor or an engine). When actuated the prime mover 36 drives the crawlers 34 to the move the excavator 10. The excavator 10 further includes a cab portion 38, an arm assembly 42 movably coupled to the chassis 30, and a bucket 46 movably coupled to the arm assembly 42. The arm assembly 42, the bucket 46, or both may have a camera 48 for viewing the surrounding area, the contents of the bucket 46, the contents of the dump truck 20, or a combination of the surrounding area, the contents of the bucket 46 and the contents of the dump truck 20. Moreover, the bucket 46 may have one or more sensors 49 (e.g., load sensors, position sensors, accelerometers, etc.) for determining the amount of a load contained therein. The cab portion 38 includes a control assembly including an operator interface 50 (e.g., an interface that is manipulatable via buttons or a touch screen interface that manipulatable via pressure applied to one or more images/graphical representations) and one or more actuators (e.g., a steering actuators, arm assembly actuators, bucket actuators, camera actuators, etc.) for driving and controlling the excavator 10. The excavator 10 has a controller 54 that is configured to communicate with the operator interface 50.

The dump truck 20 includes a cab portion 60 and a dump body 64 that are supported by a chassis 68, which has a longitudinal axis A. A plurality of wheels 72 is coupled to the chassis 68. One or more of the wheels 72 may have one or more sensors 74 (e.g., pressure sensors, load sensors, traction sensors, etc.) configured to determine tire pressure, traction, terrain type, or a combination of tire pressure, traction, and terrain type. The dump truck 20 further includes a prime mover 76 (e.g., a motor or an engine, not shown). When actuated, the prime mover 76 drives the wheels to the move the dump truck 20. The dump body 64 includes a dump bed 78, a plurality of walls 79, and a tailgate (not shown). Together, the dump bed 78 and the plurality of walls 79 receive and retain a material therein. One of the plurality of walls 79 (e.g., a rear wall) may be shorter than the others. The dump bed 78 includes a first end 80 (e.g., front end) and a second end 81 (e.g., rear end) opposite the first end 80. The first end 80 is positioned adjacent the cab portion 60 while the second end 81 is positioned adjacent a rear of the dump truck 20. The dump bed 78, one or more of the plurality of walls 79, or the dump bed 78 and the plurality of walls 79 has one or more sensors 82 (e.g., load sensors, position sensors, accelerometers, cameras, etc.). In some embodiments, the dump bed 78 has one or more heaters 84.

The dump body 64 is movable relative to the chassis 68 between a first position in which a plane defined by the dump bed 78 is at a first angle relative to the longitudinal axis A of the chassis 68 and a second position in which the plane defined by the dump bed 78 is at a second angle relative to the longitudinal axis A of the chassis 68. The second angle is steeper than the first angle. For example, the first angle may be parallel (e.g., a 0 degree angle) to the longitudinal axis A and the second angle may be between 0 degrees and 70 degrees. The dump body 64 is movable between the first and second positions by actuators 85 (e.g., hydraulic actuators, only one of which is shown in FIG. 1) positioned between the chassis 68 and the dump body 64. The actuators 85 may have one or more sensors 86 (e.g., load sensors, position sensors, accelerometers, etc.).

The cab portion 60 includes a control assembly including an operator interface 88 and one or more actuators (e.g., steering actuators, dump body actuators, etc.) for driving and controlling the dump truck 20. The dump truck 20 has a controller 92 that is configured to communicate with the operator interface 88, the sensors 74, 82, 86, the heater 84, and the controller 54 of the excavator 10.

The bucket 46 of the excavator 10 is configured to move (e.g., pick up and unload) material from a first location to a second location. In this case, the second location is the dump body 64 of the dump truck 20. The dump truck 20 (and specifically the dump body 64) is used to carry different types of materials (e.g., sand, soil, clay, gravel, rocks, slurries, etc.) from one jobsite to another). For certain types of loads (e.g., in quarries and surface mining operations) almost two-thirds of the total weight lands upon the rear axle.

Figure 2A:
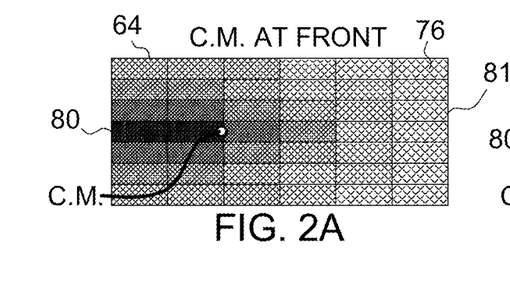
FIG. 2A illustrates a load distribution of a first material on a bed for receiving material of the second machine.

As shown in FIG. 2A, the center of mass C.M. should be near the first end 80 of the dump bed 78 for sticky and/or cohesive materials (e.g., wet clay, frozen clay, asphalt, etc.). Ideally, these materials would be kept away from the second end 81. Other materials for which a center of mass C.M. should be near the first end 80 of the dump bed 78 are large-size stones and rock. These materials must be loaded away from second end 81, so that they are released only upon complete tailgate-lift (e.g., they can flow easily upon complete tailgate lift). That is, a majority of the load should be concentrated adjacent to the first end 80 of the dump bed 78. That is, a majority of the load should be concentrated nearer to the first end 80 than to second end 81. For each of these materials, to achieve a center of mass C.M. nearer to the first end 80 of the dump bed 78 than to the second end 81, the materials should be loaded beginning near the front of the dump bed 78. The first dump from the bucket 46 of the excavator 10 should be loaded nearer to the first end 80 of the dump bed 78 than to the second end 81.

Figure 2B:
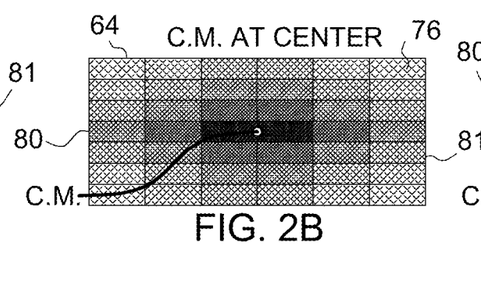
FIG. 2B illustrates a load distribution of a second material on the bed of the second machine.

Further with respect to FIG. 2B, the center of mass C.M. should be near the center (e.g., between the first end 80 and the second end 81) of the dump bed 78 for static or free flowing materials (e.g., sand, slurry, and snow). These materials may be loaded uniformly with the center of mass C.M. at the center of the dump bed 78. For each of these materials, to achieve a center of mass C.M. near the center of the dump bed 78, the materials should be loaded beginning near the center of the dump bed 78. The first dump from the bucket 46 of the excavator 10 should be loaded near the center of the dump bed 78.

Figure 2C:
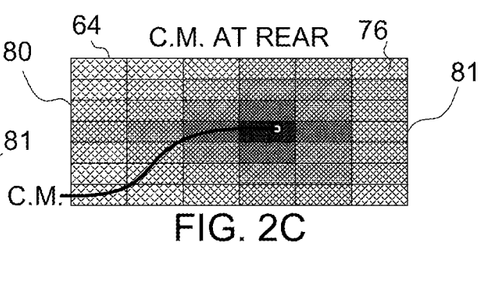
FIG. 2C illustrates a load distribution of a third material on the bed of the second machine.

Further with respect to FIG. 2C, the center of mass C.M. should be near the second end 81 of the dump bed 78 for materials with poor flow (e.g., demolition waste). These materials must be loaded in lesser quantities and a majority of the load should be concentrated nearer to the second end 81 than to the first end 80 so they be released easily. For each of these materials, to achieve a center of mass C.M. nearer to the second end 81 of the dump bed 78 than to the first end 80, the materials should be loaded beginning nearer to second end 81 of the dump bed 78 than to the first end 80. The first dump from the bucket 46 of the excavator 10 should be loaded nearer to the second end 81 of the dump bed 78 than to the first end 80.

Figure 3A:
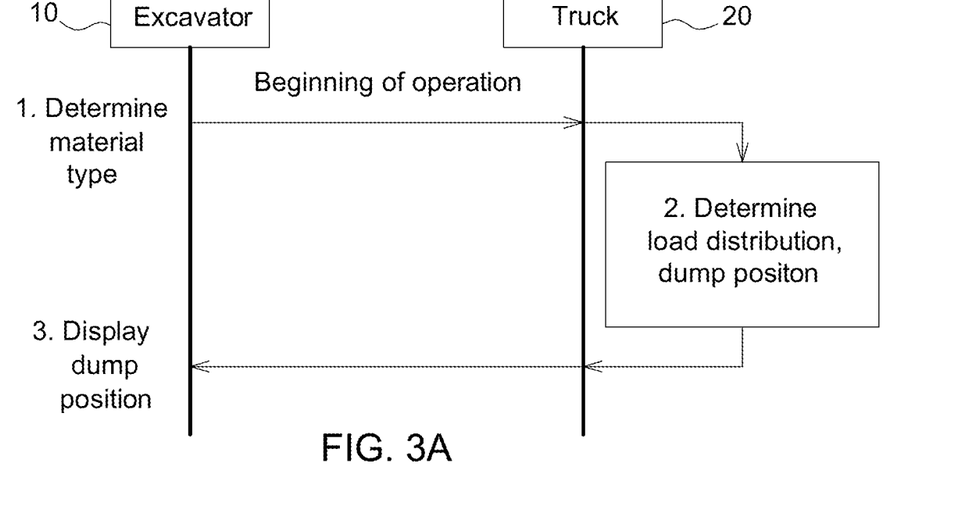
FIG. 3A illustrates a flowchart for determining a load distribution and a first position on the bed on which a material may be unloaded.

With respect to FIGS. 1A and 3A, the system assists the operator of the excavator 10 in moving (e.g., picking up and unloading) a material into the dump bed 78 to achieve a correct or ideal center of mass C.M. for the specific material type (e.g., wet clay, frozen clay, asphalt, stones, rocks, snow, slurry, demolition waste, a combination of one or more materials, etc.). In particular, the controller 54 of the excavator 10 is configured to receive a first signal corresponding to the material being moved by the bucket 46 of the excavator 10. In the illustrated embodiment, the operator may select the material from a plurality of materials displayed on the operator interface 50 of the excavator 10 to generate the first signal. For example, the plurality of material may be displayed on a menu on the operator interface 50. The menu may be broken down by class of material (e.g., sticky and/or cohesive materials, static or free flowing materials, or poorly flowing materials, etc.), material type (e.g., wet clay, frozen clay, asphalt, stones, rocks, snow, slurry, demolition waste, a combination of one or more materials, etc.). Moreover, the menu may include options for a mix of classes of materials or a mix of material types (e.g., mix of rock and sand, etc.). The controller 54 of the excavator is configured to receive the first signal from the operator interface 50 when the operator selects the material. In other embodiments, the first signal may be generated and sent to the controller 54 of the excavator 10 by other means. For example, in some embodiments, the controller 54 of the excavator 10 may be configured determine the material based on an input received from the camera 48. That is, the input from the camera 48 may generate the first signal. In still other embodiments, the controller 54 of the excavator 10 is configured to communicate with a global positioning system (GPS) and to determine the material based on coordinates provided by the global positioning system to the controller 54 of the excavator 10. Accordingly, the first signal corresponds to the coordinates determined by the global positioning system. In still other embodiments, the controller 54 of the excavator 10 is configured to receive the material from an operator input device (e.g., a mobile device) that is separate from the excavator 10 and dump truck 20. In this case, the first signal is generated and sent by the operator input device to the controller 54 of the excavator 10.

The controller 54 of the excavator 10 sends (e.g., via WiFi, Bluetooth, radio, the cloud, or any other suitable wireless protocol) a second signal corresponding to the material being moved to the controller 92 of the dump truck 20. The controller 92 of the dump truck 20 is configured to determine (i) a load distribution based on the material (e.g., similar to that shown in FIGS. 2A-2B), (ii) a position of the center of mass C.M. based on the material and determined load distribution (e.g., similar to that shown in FIGS. 2A-2B), and (iii) an instantaneous position of the center of mass C.M.

The controller 92 may use one or more of the following factors to determine the load distribution and the position of the center of mass C.M.: an average of material properties (e.g., size, density, weight, etc.) of the material (e.g., the material as a whole, the constituents of the material, or both), weather conditions (e.g., humidity, temperature, precipitation, visibility, etc.), dump bed 78 dimensions, tail gate size, sensed tire pressure of one or more of the tires 72, material properties of the actuators 85 (e.g., wear and tear of the actuators 85 as determined by the age, usage, etc., of the dump truck 20), dump bed heaters 84, dump bed extensions, and path-planning information (e.g., whether the dump truck 20 shall move uphill or downhill, a determination of slope and/or turn radius measurements, and/or wheel 72 slip estimations as determined by other machines on the work site and/or trips taken along the same paths, distances, terrain conditions, etc.). In some embodiments, as noted above, the material is not a single material but a mix of materials. Therefore, an additional factor used by the controller 92 may be the percent composition of material mix (e.g., in the case of an underwater dredging operation, the mix of materials may be 30% silt, 70% clay), which may be manually input or computed (by the controller 54, 92, respectively, of either the excavator 10 or the dump truck 20). The density of a material is often a good estimate of percent composition, for example. The density may be computed if the volume and weight of the material to be loaded is known. The volume of the material to be loaded may be measured or otherwise determined by the excavator 10 (e.g., via the camera) or may be considered to be constant. The weight of the material to be loaded may be measured or otherwise determined by either the excavator 10 or the dump truck 20 (via sensor information in the bucket 46 or the dump bed 78). In some embodiments, one or more of these factors may be manually input and sent to the excavator controller 54 for transmission to the controller 92 of the dump truck 20 via the operator interface 50 of the excavator 10. In other embodiments, one or more of these factors may be manually input and sent to the controller 92 of the dump truck 20 via the operator interface 88 of the dump truck 20. In still other embodiments, one or more of these factors may be determined by a site supervisor and sent to the controller 92 of the dump truck 20 via a separate operator interface (e.g., a mobile device). In still other embodiments, one or more of these factors may be automatically determined (via sensor information, camera footage, wirelessly via a GPS or cloud system, or a database stored in a memory associated with one of the controllers 54, 92, etc.) and sent to the controller 92. In still other embodiments, one more of these factors may be determined by a combination of manual input via the operator interface 50, the operator interface 88, a separate operator interface, and automatically. The instantaneous position of the center of mass C.M. is determined by the controller 92 of the dump truck 20 based on sensed information by the dump bed sensor 82, the wheel sensors 74, or both the dump bed and wheel sensors 82, 74 of the dump truck 20.

The controller 92 of the dump truck 20 is configured to determine a first position on the dump bed 78 where a first dump of the material should be unloaded from the bucket 46 of the excavator 10 based on the determined load distribution, the determined position of the center of mass C.M., and the instantaneous position of the center of mass C.M. The controller 92 of the dump truck 20 is configured to send a third signal corresponding to the first position at which the material should be added to the dump bed 78 to the controller 54 of the excavator 10. In some embodiments, a signal corresponding to the determined load distribution may also be sent by the second controller 92 to the first controller 54. The first position, the determined load distribution, or both may be displayed on the operator interface 50 of the excavator 10. The operator of the excavator 10, assisted by the one or more cameras 48 and the amount of load sensed by the sensor(s) 49 of the bucket 46, for example, may then unload the first dump of the material to the first position on the dump bed 78.

As shown, in FIG. 3, this process is repeated for each successive dump of the excavator 10 until the dump body 64 reaches a maximum capacity (e.g., as determined by the determined load distribution and sensed by the sensors 74, 82) for the material. More specifically, the controller 92 of the dump truck 20 is configured to determine, based on the material type, the load distribution of the material on dump bed 78, and the sensed information from the sensors 74, 82 after the first dump is unloaded on the dump bed 78, a second position on the dump bed 78 where a second dump of the material is to be unloaded from the bucket 46 of the excavator 10. This determination may be made via information from the sensors 74, 82 (which may include a camera, as noted above) of the dump truck 20. Moreover, this determination may inform the controller 92 of the load distribution, the volume, the weight, or a combination of the load distribution, the volume, and the weight of the first dump relative to the determined load distribution and determined center of mass C.M. and update the instantaneous center of mass C.M. In some embodiments, especially if the material is not uniform but mixed, the controller 92 of the dump truck 20 may determine (via sensed information from sensors of the excavator 10, sensed information from the sensors of the dump truck 20, automatically, or some combination thereof) that the determined load distribution of the material on dump bed 78 and/or the position of the center of mass C.M. needs to be modified. For example, if the mix of materials is different than initially determined (e.g., more watery, more dense, heavier, having constituent particles being larger or smaller in size and/or weight, etc.), the material properties, percent composition, or both may be determined dynamically (e.g., in real-time via sensed information from sensors of the excavator 10, sensed information from the sensors of the dump truck 20, automatically, or some combination thereof) to modify the determined load distribution of the material on dump bed 78 and/or the position of the center of mass C.M. prior to determining the second position on the dump bed 78. Once the second position is determined, the controller 92 of the dump truck 20 then sends a fourth signal corresponding to the second position to the controller 54 of the excavator 10. In some embodiments, a signal corresponding to a current load distribution after the first dump and relative to the determined and/or updated load distribution may also be sent by the second controller 92 to the first controller 54. The second position, the current load distribution, or both may be displayed on the operator interface 50 of the excavator 10. The operator of the excavator 10, assisted by the one or more cameras 48 and the amount of load sensed by the sensor(s) 49 of the bucket 46, for example, may then unload the second dump of the material to the second position.

Figure 3B:
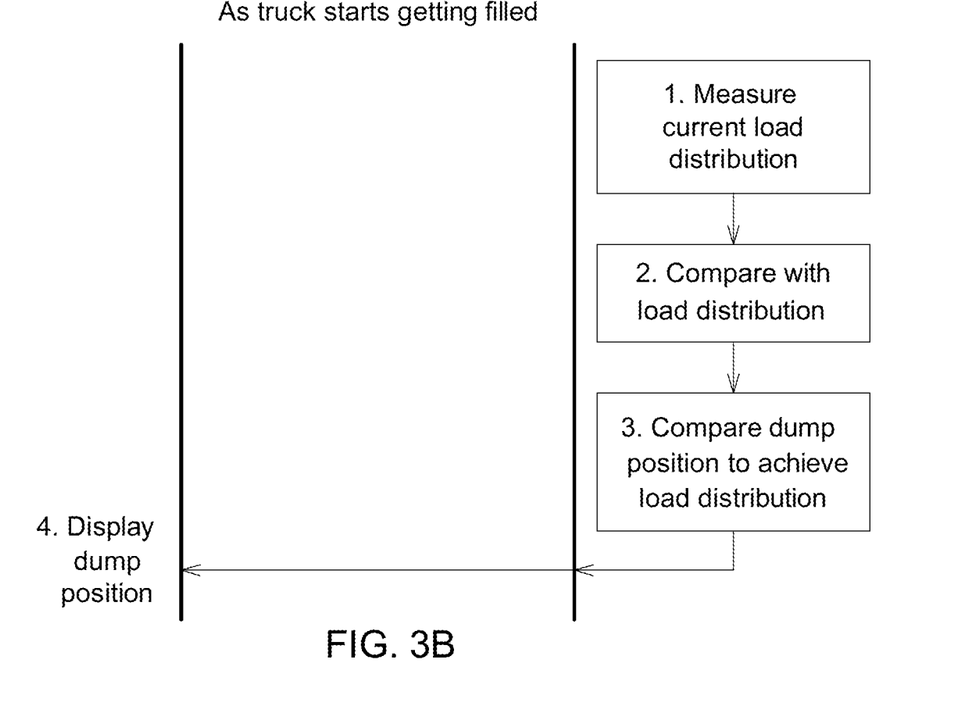
FIG. 3B illustrates a flowchart for determining a second position on the bed on which a material may be unloaded.

Similarly, the controller 92 of the dump truck 20 is configured to determine, based on the load distribution of the material on dump bed 78 and sensed information from the sensors 74, 82 after the second dump is unloaded on the dump bed 78, a third position on the dump bed 78 where a third dump of the material is to be unloaded from the bucket 46 of the excavator 10. The controller 92 then sends a fifth signal corresponding to the third position to the controller 54 of the excavator 10. This determination may be made via information from the sensors 74, 82 (which may include a camera, as noted above) of the dump truck 20. This determination may inform the controller 92 of the load distribution, the volume, the weight, or a combination of the load distribution, the volume, and the weight of the first two dumps relative to the determined load distribution and determined center of mass C.M. and update the instantaneous center of mass C.M. In some embodiments, a signal corresponding to a current load distribution after the second dump and relative to the determined and/or updated load distribution may also be sent by the controller 92 of the dump truck 20 to the controller 54 of the excavator 10. The third position, the current load distribution, or both may be displayed on the operator interface 50 of the excavator 10. The operator of the excavator 10, assisted by the one or more cameras 48 and the amount of load sensed by the sensor(s) 49 of the bucket 46, for example, may then unload the third dump of the material to the third position.

In some embodiments, the operator of either or both of the excavator or the dump truck 20 may choose to override the determined load distribution based on the material. Similarly, in some embodiments, the operator of either or both of the excavator 10 or the dump truck 20 may choose to override the determined dump position based on the load distribution and the material.

In other embodiments, the controller 92 of the dump truck may be configured to determine the material being moved by the excavator 10. The controller 92 may obtain the material information via similar means as discussed above with respect to the means of for obtaining the material information via the excavator 10. More specifically, the controller 92 may determine the material being moved via operator input into the operator interface 88, sensed information from a camera, a GPS satellite in communication with the second controller 92, or a separate operator input device, among other means. In this case, the controller 54 of the excavator does not receive and send the first signal. Rather, the controller 92 of the dump truck 20 obtains the material and operates as discussed above.

In some embodiments, either or both of the controllers 54, 92 may receive a signal from respective operator interface 50, 88, a separate operator interface (e.g., a mobile device), or automatically (e.g., via GPS, the cloud, etc.) corresponding to weather in the area, which may affect the properties of the material that is being moved. The signal corresponding to weather may also be used to determine the position of each successive dump of material (e.g., first position, second position, third position, etc.). In some embodiments, the controller 92 of the dump truck 20 is configured activate the heater 84 to modify properties of the material after the first dump is unloaded onto the dump bed. For example, if the material is snow, the heater 84 may be activated to melt the snow. The controller 92 may be activated based on the material, the weather, or both the material and the weather.

The material type may be used to control the dump truck 20 also. In some embodiments, the controller 92 may be configured to alert the operator to an appropriate speed at which to operate the dump truck 20 (e.g., when turning the dump truck 20) based on the material. As noted above, the dump body 64 is movable between the first position and the second position. In some embodiments, one of the sensors 74, 82 of the dump truck 20 may be a position sensor configured to detect the position of the dump bed 78 relative to the longitudinal axis A and configured to communicate with the controller 92 of the dump truck 20. In some embodiments, the sensors 86 of the actuators 85 may be configured to detect the position of the dump bed 78 relative to the longitudinal axis A and configured to communicate with the controller 92 of the dump truck 20. The controller 92 may be configured to determine the non-parallel angle of the second position based on the material type and sensed information from one or more of the sensors 74, 82, 86. Moreover, the controller 92 may be configured to move the dump bed 78 from the first position to the second position at a speed based on the material and sensed information from one or more of the sensors 74, 82, 86.

In some embodiments, the excavator may be one of several excavators and the dump truck 20 is one of several dump trucks 20 in the area (e.g., at the worksite). Accordingly, each of the excavators 10 and dump trucks 20 may have similar features as discussed above. The excavators 10 and the dump trucks 20 in the area may communicate with one another to share information related to the material being moved. For example, a second dump truck 20 may include a dump bed 78 that receives the material from the bucket 46 of the excavator 10, sensors 74, 82, 86 configured to measure the load of a dump bed 78, and a controller 92 configured to communicate with the sensors 74, 82, 86 and the controller 54 of the excavator 10. The controllers 92 of the first dump truck 20 and the second truck 20 may communicate. Accordingly, the controller 92 of the first dump truck 20 may be configured to send a signal corresponding to the determined load distribution of the material to the controller 92 of the second dump truck 20, such that the second dump truck 20 may operate as discussed above to properly instruct loading of the material from the excavator 10. Alternatively, the controller 54 of the excavator 10 may be configured to send a signal corresponding to the material being moved by the bucket 46 to the controller 92 of the second dump truck 20, such that the second dump truck 20 may operate as discussed above to properly instruct loading of the material from the excavator 10. In some embodiments, a first excavator 10 may be unloading a first material into the dump bed 78 of the dump truck 20 and a second excavator 10 may be unloading a second material into the dump bed 78 of the dump truck 20. The second material may be the same or different than the first material. Accordingly, the controller 92 of the dump truck 20 may be configured to send signals corresponding to the determined load distribution of the material and recommended dump positions to the controllers 54 of both the first and second excavators 10, such that both the first and second excavators 10 may operate as discussed above to properly instruct loading of the material to the dump truck 20. Moreover, if the first and second materials are different, the controller 92 may operate similarly to when a mix of materials is being added by a single excavator 10, as discussed above. That is, the controller 92 of the dump truck 20 may continually update (via sensed information from sensors of the first and second excavators 10, sensed information from the sensors of the dump truck 20, automatically, or some combination thereof) the determined load distribution of the material on dump bed 78 and/or the position of the center of mass C.M. as necessary with each successive dump, as discussed above.

The system and method discussed above may improve stability of the dump truck 20, operator productivity, jobsite efficiency, and fuel efficiency of the excavator 10. Specifically, accurate placement of a load on the dump bed 78 or in the dump body 64 during each loading operation supports the operator of the excavator 10 in decision making and reduces time required to fill the dump body 64. Moreover, there is less idle time by operators and the machines 10, 20. First, because this system and method better estimates the time required to load each truck 20. Second, because the excavator and the dump truck 20 can be run (and therefore use fuel) based on the time actually loading the trucks 20 rather than time spent waiting for trucks to be filled, emptied, and returned for another load.

Various features of the disclosure are set forth in the following claims.

What is claimed is:

1. A system for moving material, the system including:
   a first machine including a bucket configured to move a material, an operator interface, and a first controller configured to communicate with the operator interface; and
   a second machine having a front end and a rear end and including a dump bed, the dump bed including a first end positioned adjacent the front end of the second machine and a second end positioned adjacent the rear end of the machine, the dump bed configured to receive the material from the first machine, a sensor configured to measure the load of the dump bed, and a second controller configured to communicate with the sensor and the first controller,
   wherein the first controller is configured to receive a first signal corresponding to a type of the material being moved by the bucket from the operator interface and generate a second signal corresponding to the type of the material being moved by the bucket,
   wherein the second controller is configured to
      determine, based on the second signal, a load distribution of the material in the dump bed,
      determine, based on the load distribution, a first position of the dump bed at which a first dump should be unloaded from the bucket of the first machine, and
      send a third signal corresponding to the first position to the first controller,
   wherein the first controller is configured to display the first position on the operator interface,
   wherein when the type of material is wet clay, frozen clay, asphalt, stones, or rocks, the load distribution in the dump bed positions a center of mass nearer to the first end of the dump bed than to the second end and the displayed first position of the dump bed is nearer to the first end of the dump bed than to the second end,
   wherein when the material is sand, slurry, or snow, the load distribution in the dump bed positions the center of mass between the first end and the second end and the displayed first position of the dump bed is between the first end and the second end, and
   wherein when the material is demolition waste, the load distribution in the dump bed positions the center of mass nearer to the second end of the dump bed than to the first end and the displayed first position of the dump bed is nearer to the second end of the dump bed than to the first end,
   wherein the second controller is configured to cause movement of the dump bed to the first position.

2. The system of claim 1, wherein the second controller is configured to determine, based on the load distribution of the material on the dump bed and sensed information from the sensor after the first dump is unloaded onto the dump bed, a second position of the dump bed at which a second dump of the material is to be unloaded from the bucket of the first machine, and to send a fourth signal corresponding to the second position to the first controller, and wherein the first controller is configured to display the second position on the operator interface.

3. The system of claim 2, wherein the second machine includes a longitudinal axis, the dump body being movable between a first position in which the dump bed is oriented at a first angle relative to the longitudinal axis and a second position in which the dump bed is positioned at a second angle relative to the longitudinal axis, the material being loaded into the dump body when the dump body is in the first position and the material being unloaded from the dump body when the dump body is in the second position, and wherein the second machine has a position sensor configured to detect the position of the dump bed relative to the longitudinal axis and configured to communicate with the second controller, the second controller configured to determine the non-parallel angle of the second position based on the type of the material.

4. The system of claim 3, wherein the second controller is configured to cause movement of the dump bed from the first position to the second position at a speed that is determined by the second controller and based on the type of the material.

5. The system of claim 2, wherein the second controller is configured to cause movement of the dump bed to the second position, and wherein the first controller is configured to display the load distribution of the dump body on the operator interface.

6. The system of claim 1, wherein the second machine includes a plurality of wheels, at least one tire sensor configured to sense a characteristic of at least one of the plurality of wheels and configured to communicate with the second controller, the second controller configured to use sensed characteristic information from the at least one tire sensor to determine the load distribution of the material in the dump bed and to determine the first position of the dump bed at which the first dump should be unloaded from the bucket of the first machine.

7. The system of claim 1, wherein the dump bed includes a heater configured to communicate with the second controller, the second controller configured to activate the heater to modify properties of the material after the first dump is unloaded onto the dump bed.

8. The system of claim 1, further comprising a third machine including a dump bed that is configured to receive the material from the bucket of the first machine, a sensor configured to measure the load of a dump bed of the third machine, and a third controller configured to communicate with the sensor of the third machine and the first controller, wherein the second controller is configured to send a signal corresponding to the load distribution of the material to the third controller.

9. The system of claim 1, wherein the first controller is configured to display the load distribution of the dump body on the operator interface.

10. A system for moving material, the system including:
a first machine that moves a material, the first machine including a first controller, a moveable container, and an operator interface; and
a second machine including a dump bed that receives the material from the first machine, a sensor configured to measure a load on the dump bed, and a second controller configured to communicate with the sensor and the first controller,
wherein the first controller is configured to receive a first signal corresponding to a type of the material being moved by the first machine and send a second signal corresponding to the type of the material being moved by the first machine to the second controller, the dump bed including a first end positioned adjacent a front end of the second machine and a second end positioned adjacent a rear end of the machine,
wherein the second controller is configured to
determine, based on the second signal, a load distribution of the material in the dump bed,
determine, based on the load distribution, a first position of the dump bed where a first dump should be unloaded from the moveable container of the first machine, and
send a third signal corresponding to the first position to the first controller,
wherein the first controller is configured to display the first position on the operator interface,
wherein when the material is wet clay, frozen clay, asphalt, stones, or rocks, the load distribution in the dump bed positions a center of mass nearer to the first end of the dump bed than to the second end and the first position of the dump bed is nearer to the first end of the dump bed than to the second end,
wherein when the material is sand, slurry, or snow, the load distribution in the dump bed positions the center of mass between the first end and the second end and the first position of the dump bed is between the first end and the second end, and
wherein when the material is demolition waste, the load distribution in the dump bed positions the center of mass nearer to the second end of the dump bed than to the first end and the first position of the dump bed is nearer to the second end of the dump bed than to the first end,
wherein the first controller is configured to cause movement of the moveable container to a location above the first position of the dump bed.

11. The system of claim 10, wherein the second controller is configured to determine, based on the load distribution of the material on the dump bed and sensed information from the sensor after the first dump is unloaded onto the dump bed, a second position of the dump bed at which a second dump of the material is to be unloaded from the first machine, and to send a fourth signal corresponding to the second position to the first controller, and wherein the first controller is configured to display the second position on the operator interface.

12. The system of claim 10, wherein the operator interface that has a menu having a list of materials, and wherein the type of material is selected from the list of materials to generate the first signal.

13. The system of claim 10, wherein the first machine includes a camera, and wherein an input from the camera is configured to communicate with the first controller, the input from the camera at least partially determining the first signal.

14. The system of claim 10, wherein the first controller is configured to communicate with a global positioning system configured to determine coordinates of the material and wherein the first signal corresponds to the coordinates determined by the global positioning system.

15. The system of claim 10, wherein the first signal is generated and sent to the first controller by an operator input device that is separate from the first machine and second machine.

16. The system of claim 10, wherein the moveable container includes a weight sensor, the first controller configured to send a fourth signal corresponding to the sensed weight of the moveable container to the second controller, the third signal based at least partially upon the fourth signal.

17. A method of moving material, using a first machine, from a first location to a second location, the second location being a dump bed of a second machine, the method comprising:
determining a type of a material to be moved based upon input from a user interface;
sending, by the controller of the first machine, the material type to a controller of the second machine;
sensing a weight of material in a bucket;
communicating the sensed weight to a controller of a second machine;
determining, by a controller of the second machine,
a load distribution on the dump bed based on the material,
whether a center of mass of the load distribution is to be nearer to a front end of the dump bed than to a rear end, between the front end of the dump bed and the rear end of the dump bed, or nearer to the rear end of the dump bed than to the front end,
a first position of the dump bed at which a first dump should be unloaded from the first machine, the first position based upon the load distribution and upon the sensed weight, and
whether the first position of the first dump is to be nearer to the front end of the dump bed than to the rear end, between the front end of the dump bed and the rear end of the dump bed, or nearer to the rear end of the dump bed than to the front end,
wherein when the material is wet clay, frozen clay, asphalt, stones, or rocks, the load distribution in the dump bed positions the center of mass nearer to the first end of the dump bed than to the second end and the first position of the dump bed is nearer to the first end of the dump bed than to the second end;
sending, by the controller of the second machine, an identification of the first position to the controller of the first machine;
displaying the first position on the user interface of the first machine, and
sending, by the first controller, a signal to the bucket to thereby cause movement of the bucket to a location above the first position of the dump bed.

18. The method of claim 17, further comprising
sensing a distribution of the material of the first dump on the dump bed;
determining, by the controller of the second machine, a second position of the dump bed based on the load distribution of the type of material in the dump bed and the sensed distribution after the first dump is unloaded in the dump bed;
sending, by the controller of the second machine, an identification of the second position to the controller of the first machine; and displaying the second position on the user interface of the first machine.

19. The method of claim 18, further comprising determining a speed at which the dump bed is to be moved from the first position to the second position at a speed based at least upon the material type.

* * * * *